(12) United States Patent
Paterson et al.

(10) Patent No.: US 8,850,572 B2
(45) Date of Patent: Sep. 30, 2014

(54) METHODS FOR HANDLING A FILE ASSOCIATED WITH A PROGRAM IN A RESTRICTED PROGRAM ENVIRONMENT

(75) Inventors: Toby Paterson, San Francisco, CA (US); Jason C. Beaver, San Jose, CA (US); Gregory Novick, Santa Clara, CA (US); John Iarocci, Los Gatos, CA (US); Curtis C. Galloway, Santa Cruz, CA (US); Dallas B. De Atley, San Francisco, CA (US); Christopher S. Linn, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 12/688,724

(22) Filed: Jan. 15, 2010

(65) Prior Publication Data
US 2011/0179483 A1 Jul. 21, 2011

(51) Int. Cl.
*G06F 21/00* (2013.01)
*G06F 21/53* (2013.01)
*G06F 21/56* (2013.01)

(52) U.S. Cl.
CPC .............. *G06F 21/53* (2013.01); *G06F 21/56* (2013.01)
USPC .......................................................... 726/22

(58) Field of Classification Search
USPC ........................................ 726/22, 23, 24, 25
See application file for complete search history.

(56) References Cited

U.S. PATENT DOCUMENTS

| 7,421,702 | B1 * | 9/2008 | Margulis et al. ............... 719/316 |
| 2004/0139334 | A1 * | 7/2004 | Wiseman ....................... 713/188 |
| 2006/0021029 | A1 | 1/2006 | Brickell et al. |
| 2006/0230454 | A1 * | 10/2006 | Achanta et al. .................. 726/24 |
| 2007/0244877 | A1 * | 10/2007 | Kempka ............................ 707/5 |
| 2008/0127292 | A1 | 5/2008 | Cooper et al. |
| 2009/0165133 | A1 * | 6/2009 | Hwang et al. .................... 726/22 |
| 2009/0282477 | A1 * | 11/2009 | Chen et al. ....................... 726/22 |
| 2009/0300599 | A1 * | 12/2009 | Piotrowski ...................... 717/174 |
| 2010/0122343 | A1 * | 5/2010 | Ghosh et al. ..................... 726/23 |
| 2010/0192224 | A1 | 7/2010 | Ferri et al. |
| 2010/0306849 | A1 * | 12/2010 | Zheng et al. ..................... 726/24 |
| 2011/0179362 | A1 * | 7/2011 | Craddock et al. .............. 715/752 |
| 2013/0055396 | A1 * | 2/2013 | Wang et al. ...................... 726/24 |
| 2013/0179287 | A1 * | 7/2013 | Slobodskiy et al. ......... 705/26.1 |
| 2013/0179414 | A1 * | 7/2013 | Hoogerwerf et al. ......... 707/694 |
| 2014/0068779 | A1 * | 3/2014 | Tan et al. ......................... 726/26 |

* cited by examiner

*Primary Examiner* — Jeffrey Williams
(74) *Attorney, Agent, or Firm* — Blakely, Sokoloff, Taylor & Zafman LLP

(57) ABSTRACT

Techniques for handling a file associated with a program are described herein. According to an aspect of the invention, in response to a request for accessing a file received through a first program, the file is stored in a first sandboxed storage area, where the file is to be accessed by a second program. An atomic move operation is then performed on the file that atomically moves the file from the first sandboxed storage area to a second sandboxed storage area, where the first sandboxed storage area is not accessible to the first program and second program. The second program is launched to access the file stored in the second sandboxed storage area, where the second sandboxed storage area is a part of a sandbox associated with the second program.

27 Claims, 4 Drawing Sheets

METHODS FOR HANDLING A FILE ASSOCIATED WITH A PROGRAM IN A RESTRICTED PROGRAM ENVIRONMENT

FIELD OF THE INVENTION

Embodiments of the invention relate generally to the field of secure computing, including handling a file associated with a program in a restricted program environment.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses", "worms", "Trojan horses", "spyware", "adware", and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

In one particular situation, one application such as a mail client may handle an electronic mail having an attachment therein. When a user attempts to open the attachment, another application is invoked to open the attachment. If the attachment contains malicious code, the execution of the attachment by the second application may cause damages to either or both applications, which in turn may cause damages to the entire system.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, there has been a lack of efficient ways for handling a file associated with an application that invokes another application in a secured manner.

SUMMARY OF THE DESCRIPTION

Techniques for handling a file associated with a program are described herein. For example, in response to a request for accessing a file received, stored, or created through a first program, the file can be stored in a first sandboxed storage area, where the file is opened by a second program. An atomic move operation can then be performed on the file that atomically moves the file from the first sandboxed storage area to a second sandboxed storage area, where the first sandboxed storage area is not accessible to the first and second programs. The second program can be launched or invoked to access the file stored in the second sandboxed storage area, where the second sandboxed storage area is a part of a sandbox associated with the second program.

In another embodiment, a file can also be received through a first program running within a data processing system, where the file can be accessed by a second program of the data processing system. In response to a request from a user for accessing the file, the first program can store the file in a first sandboxed storage area associated with the first program. The first sandboxed storage area is a part of a first sandbox associated with the first program and the first sandboxed storage area is not accessible to the second program. The first program can cause the file to be copied from the first sandboxed storage area to an intermediate sandboxed storage area that is not accessible from the first and second program. The file can be atomically moved from the intermediate sandboxed storage area to a second sandboxed storage area that is a part of a second sandbox associated with the second program. Thereafter, the second program can be invoked to access the file from the second sandboxed storage area, which is not accessible from the first program.

According to another embodiment, a first program executed within a data processing system can receive a filename and a directory path referenced to a file stored in a first sandboxed storage area, where the first sandboxed storage area can be part of a first sandbox associated with the first program. The file can be provided from a second program executed within the data processing system, where in response to a user request to access the file from the second program, the file can be stored in a second sandboxed storage area that is a part of a second sandbox associated with the second program, which is not necessarily accessible by the first program. The file may be copied from the second sandboxed storage area to an intermediate sandboxed storage area that is not accessible by the first and second programs. The file can be atomically moved from the intermediate sandboxed storage area to the first sandboxed storage area. Thereafter, the first program can access the file from the first sandboxed storage area.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
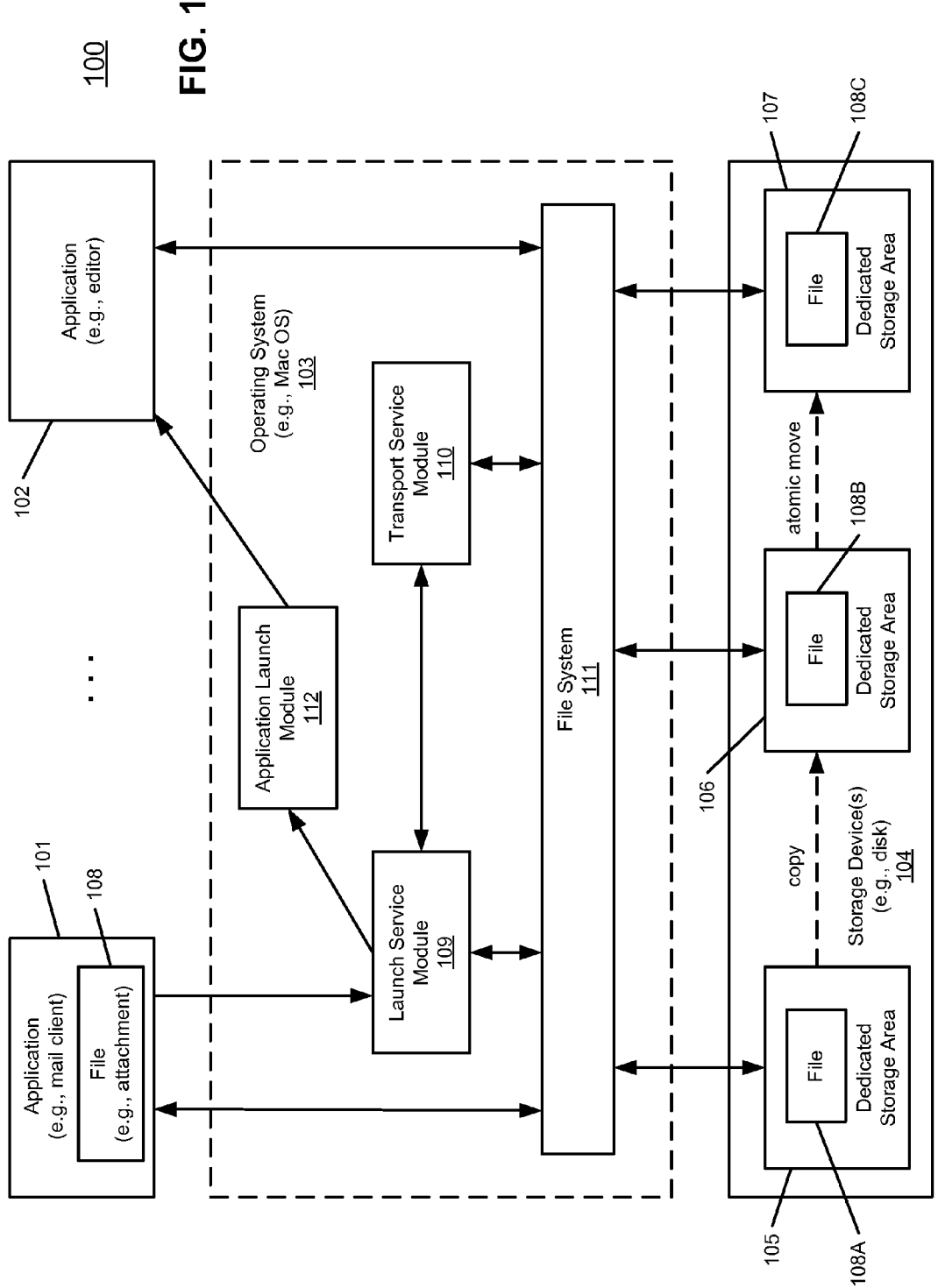
FIG. 1 is a block diagram illustrating a system example of handling a file associated with a program in a secured manner according to one embodiment.

Techniques for handling a file associated with a program are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a sandboxing technique or mechanism is utilized to provide isolations (e.g., sandboxed) among application programs such that one application or program cannot directly access resources (e.g., a memory and/or a storage area) of another application or program. When a user attempts to access an attachment of a first application (e.g., an electronic mail client) or download a file from a network (e.g. from a web site via a web browser or from a remote server via a remote access application), the attachment or downloaded file is stored as a file in a first dedicated storage area of the first application. The attachment is intended to be accessed by a second application (e.g., a word processor or editor). The file is then copied from the first dedicated storage area of the first application to an intermediate dedicated storage area. Within the intermediate dedicated storage area, one or more content analysis operations, such as virus detection and removal operations, may be performed. In addition, any filename conflict may be resolved within the intermediate dedicated storage area. The filename conflict resolution may occur by examining the destination application's sandbox or application container, which is referred to herein as the second application. An atomic move operation is then performed that moves the file from the intermediate dedicated storage area to a second dedicated storage area associated with the second application. Thereafter, the second application is launched or invoked to access and access the file from the second dedicated storage area. Alternatively, the file may be moved or copied from the first dedicated storage area directly to the second dedicated storage area without using the intermediate dedicated storage area.

As a result, the first application cannot access the second dedicated storage area of the second application, or vice versa. In addition, since the file has been sandboxed during the transactions and the execution of accessing the file by the second application is sandboxed within a sandbox of the second application, any damage caused by the execution of the file is limited within the sandbox of the second application. Similarly, any damage caused by downloading the attachment from the first application is limited within the sandbox of the first application. Therefore, the security of the attachment handling has been greatly improved. One of the main motivations for having the sandbox is to prevent a malicious, compromised, or malfunctioning application from modifying data that is owned by or associated with another application or the OS. Embodiments of the invention described throughout this application allow such a security feature to be maintained while also allowing documents or files opened or accessed explicitly by the user to be transported for accessing in another application. For the purposes of illustration, "an application" and "a program" are interchangeable terms throughout this application.

FIG. 1 is a block diagram illustrating a system example of handling a file associated with an application in a secured manner according to one embodiment. System 100 as shown in FIG. 1 may be implemented as a part of a computing or electronic device mentioned above. Referring to FIG. 1, system 100 includes, but is not limited to, one or more applications 101-102 communicatively coupled to operating system (OS) 103, which may be any kind of operating systems, such as the iPhone™ OS or Mac OS X™ from Apple Inc. of Cupertino, Calif., a Windows™ operating system from Microsoft Corporation of Redmond, Wash., or alternatively a LINUX or UNIX operating system. For example, application 101 may be an electronic mail client application and application 102 may be a word processing application. In addition, system 100 includes one or more storage devices 104 accessed by applications 101-102 via file system 111 of operating system 103, where the one or more storage devices may be implemented locally, remotely, or a combination of both.

In one embodiment, applications 101-102 may be executed as a sandboxed process, where each sandboxed process is associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 100. For example, among other resources, application 101 is associated with a dedicated storage area 105 while application 102 is associated with a dedicated storage area 107. Application 101 and dedicated storage area 105, as well as other associated resources, logically as a whole is referred to as a sandbox or an application container that contains any related data, resources, and/or activities of application 101. Similarly, application 102 and dedicated storage area 107, as well as other associated data and resources, logically as a whole is referred to as another sandbox or application container.

To provide security, an application may be "contained" by restricting its functionality to a subset of user operations and only allowing operations that are necessary for the proper operation, i.e., operation according to its intended functionality. One method to implement a limited set of policies for each application is to contain, or "sandbox" the applications. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox or application container, in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each others address spaces.

A security profile (also simply referred to as a profile) can include one or more policies, where a policy is a logical expression of a permissive or restrictive action that a sandboxed process may or may not take. For example, one policy may expressly allow a mail application to access an email database. In such an example, all other actions may be impliedly denied. In some situations, a default policy is available in a security profile, such that if none of the expressed permissive policies are applicable, then the default policy (typically denial of the operation) is applied. A security profile may be associated with a sandboxed process. Alternatively, a security policy is associated with more than one sandboxed process, such as when a system-wide or global security policy is implemented. Individual profiles may be associated with distinct instances or instantiations of applications or daemons. For example, if a user executes more than one image of an application, each image may have a corresponding security profile.

In some embodiments a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode. Further detailed information concerning sandboxing techniques can be found in co-pending U.S. patent application Ser. No. 11/462,680, filed Aug. 4, 2006, which has been assigned to a common assignee of the present application and is incorporated by reference herein in its entirety.

Referring back to FIG. 1, it is assumed that applications 101-102 have been sandboxed and executed as sandboxed processes using some sandboxing techniques described above. In this example, in addition to other limited resources, application 101 is associated with a dedicated storage area (e.g., dedicated directory) 105 while application 102 is associated with a dedicated storage area (e.g., dedicated directory) 107 of one or more storage devices 104. These dedicated storage areas 105-107 can be located in the same or different physical or logical disks, which may be located locally or remotely over a network. These dedicated storage areas are also referred to as sandboxed storage areas. For example, application 101 is limited to accessing (e.g., via file system 111) content of the associated sandboxed storage area 105 and it cannot access content of sandboxed storage area 107 of application 102. Similarly, application 102 is limited to accessing (e.g., via file system 111) content of the associated sandboxed storage area 107 and it cannot access content of sandboxed storage area 105 of application 101.

For the purpose of illustration, it is assumed that application 101 is an electronic mail application while application 102 is an editing application. However, it will be appreciated that other types of applications may also be applied herein. For example, application 101 may be a web browser, network file browser, or other program for accessing files on a network, and application 102 may be a spreadsheet program, image viewing program, video display program, e-book viewer, among others. When application 101 includes a file as an attachment 108, a user can attempt to access the file from application 101 by activating (e.g., clicking, or using a touch-based or other gesture) a graphical representation, such as an icon, of file 108. It is assumed that in order to open or access file 108, application 102 is required. In response to such a user input, according to one embodiment, a launch service module 109 is invoked from application 101. Launch service module 109 may be invoked from application 101 via an application programming interface (API) (not shown), which may include an inter-process call (IPC) such as the Mach IPC communications of Mac OS™ of Apple Inc. In one embodiment, file 108 may be stored in sandboxed storage area 105 by application 101, for example, via file system 111. Application 101 than invokes the launch service module 109 with a path of file 108A. For example, in response to a user's request for accessing an attachment, an email client application downloads the attachment from the network (e.g., mail server) and saves it on to the disk (e.g., sandboxed storage area 105), then points the launch service module 109 at that path (e.g., a file directory of file 108A).

In one embodiment, launch service module 109 obtains a file descriptor (e.g., a file handle or file identifier) of file 108A via file system 111 or alternatively, from application 101 via an API. In addition, launch service module 109 examines file 108 (or file 108A) to determine which application is required or able to access the file. Typically, launch service module 109 accesses a database (not shown) that maintains mapping information concerning which type or types of files or documents can be accessed by which application or applications, in order to determine whether application 102 is capable of accessing file 108. There may be multiple applications or programs that can access the file and a user can be given the option of which application can access it (e.g., a Joint Photographic Experts Group or JPEG file can be opened by Photoshop™, Preview™, or Gimp™ application, etc). In addition, launch service module 109 may generate a new icon (e.g., graphical representation) for file 108 and associate the new icon with file 108A. In one embodiment, launch service module 109 may generate the new icon based on an icon associated with application 102. For example, launch service module 109 may combine a default icon of file 108 and the icon of application 102 to generate a new icon for file 108A.

Once file 108 has been stored in sandboxed storage area 105 as file 108A, a transport service module 110 can be invoked from launch service module 109. In one embodiment, transport service module 110 receives a file descriptor of file 108A from launch service module 109. Using the file descriptor received from launch service module 109 and via file system 111, transport service module 110 is configured to copy or move file 108A from sandboxed storage area 105 into sandboxed storage area 106 as file 108B, where sandboxed storage area 106 is associated with transport service module 110 (e.g., a part of a sandbox associated with transport service module 110) and is not accessible from either application 101 or application 102. Here, although sandboxed storage area 105 is a part of a sandbox associated with application 101, transport service module 110, as a part of a system component of OS 103, is configured to have an access privilege to access sandboxed storage area 105. One of the main features of transport service module 110 is that it is external to both applications 101-102 and therefore is privileged. Transport service module 110 can read from the sandbox of application 101 and can write to the sandbox of application 102. Neither application 101 nor application 102 can do both of those actions and thus, the external privileged service is required herein.

In addition, while file 108B is stored in sandboxed storage area 106, transport service module 110 may perform additional operations (e.g., content analysis) on file 108B. For example, transport service module 110 may perform or may invoke another module or application to perform a content analysis on file 108B, such as, for example, anti-virus operations. In one embodiment, transport service module 110 may resolve any file naming conflicts among files stored in sandboxed storage area 106, as there may be multiple files stored in sandboxed storage area 106 that have the same filename. For example, a file named "foo.txt" may be obtained by downloading from a mail as an attachment. Another file also named "foo.txt" may also be downloaded from the Web through a Web browser (e.g., another application). When a user detaches the file from the mail application and the Web, both the mail application and the Web browser may end up causing the files to be stored in sandboxed storage area 106, as sandboxed storage area 106 may serve intermediate storage area for multiple source applications (e.g., application 101 as senders) and destination applications (e.g., application 102 as recipients). As a result, there is a filename conflict or collision here.

According to one embodiment, transport service module 110 is configured to resolve the filename conflicts by renaming a filename to one that uniquely identifies the corresponding file and maintains the mapping information of a renamed file and the original filename. In addition, according to one embodiment, when file 108 is extracted from a mail and saved to sandboxed storage area 105, application 101 generates a unique key for file 108 based on mail metadata (e.g., mail identifier or ID) and the unique key is saved as a part of metadata of file 108A. Therefore, in combination of the unique key, modified filename, and its extension, transport service module can uniquely identify the file.

Furthermore, while file 108B is stored in sandboxed storage area 106, if the user attempts to access file 108 from first application 101 again, launch service module 109 is triggered to notify transport service module 110. Transport service module 110 may scan each file stored in sandboxed storage area 106 to determine whether file 108 has already been copied into sandboxed storage area 106. Based on the key, as well as other information associated with file 108B, transport service module 110 is able to determine that file 108B is associated with file 108 of application 101. As a result, there is no need to copy the file again if it is determined that file 108B exists in sandboxed storage area 106. According to another embodiment, each time there is a new request to access file 108, a new intermediate sandboxed storage area, such as sandboxed storage area 106 is created. Once the file is transferred to the receiving application (e.g., sandboxed storage area 107 or processed by application 102) or the operation fails, the intermediate sandboxed storage area may be destroyed. In this embodiment, transport service module 110 can determine whether a file already exists by examining the receiving application's sandbox (e.g., sandboxed storage area 107 of application 102) based on the file information from the sending application (e.g., application 101). Alternatively, if the intermediate sandboxed storage area 106 has been already created, transport service module 110 may examine whether file 108B already exists in sandboxed storage area 106 based on the file information from the sending application (e.g., application 101), before copying file 108A from sandboxed storage area 105. According to a further embodiment, the file 108A may be moved or copied from sandboxed storage area 105 directly to sandboxed storage area 107 without using the intermediate sandboxed storage area 106.

After transport service module 110 performs any necessary operations on file 108B, transport service module 110 causes (e.g., via file system 111) an atomic move operation to atomically move file 108B from sandboxed storage area 106 to sandboxed storage area 107 as file 108C, where sandboxed storage area 107 is a part of a sandbox associated with application 102. That is, the file 108B is atomically moved from sandboxed storage area 106 to sandboxed storage area 107 such that application 102 can only "see" either the entire file 108C or nothing. An atomic move operation is typically provided by a standard file system call or API, in which a file is prevented from being accessed while being moved. By using an atomic move operation instead of a copy operation, it would avoid the situation in which application 102 may see and try to access a portion of file 108C while file 108C is being copied. In addition, an atomic move operation is relatively less expensive compared to a copy operation in terms of a processing bandwidth of a data processing system. In one embodiment, if the file system does not support the atomic move operation, a copy operation may be utilized.

Once the file 108C has been successfully stored in sandboxed storage area 107, transport service module 110 can return a filename or file identifier, as well as any other information, such as a directory path associated with file 108C to launch service module 109. Launch service module 109 may then pass the filename of file 108C to application launch module 112, where application launch module 112 is responsible for launching application 102 if application 102 has not been launched. If application 102 is running, application launch module 112 may invoke application 102, for example, via an IPC call or alternatively, application launch module 112 may launch another instance of application 102. For example, application launch module 112 may be implemented as a part of the Springboard component of iPhone™ OS from Apple Inc. The filename or file identifier of file 108C, as well as the directory path, may also be passed as a parameter to application 102 during launching and/or invocation of application 102. Alternatively, transport service module 110 may directly invoke application launch module 112 for launching and/or invoking application 102. Application 102 can then access file 108C from sandboxed storage area 107 based on the filename and the directory path information provided by application launch module 112.

According to one embodiment, sandboxed storage area 107 includes an inbox area and a regular storage directory (not shown). File 108C is stored in the inbox area in which application 102 can only read or delete file 108C. After accessing file 108C, if application 102 modifies and attempts to store the modified file in sandboxed storage area 107, the modified file is stored as a new file in a regular storage directory. In this way, the original file is not modified in the inbox area.

Thus, file 108C is accessed by application 102 in a sandboxed storage area 107 associated with application 102, where sandboxed storage area 107 cannot be accessed by application 101 as a source that provides the file 108C. As a result, any damage caused by accessing file 108C can be limited within a sandbox associated with application 102.

Similarly, any damage caused by downloading file 108A can be limited to a sandbox associated with application 101. In addition, by using sandboxed storage area 106 associated with transport service area 110 as an intermediate sandboxed storage area, additional security processes such as anti-virus operations can be performed prior to transporting the file to sandboxed storage area 107 to be accessed by application 102.

Note that storage areas 105-107 may be implemented as local storage areas or remote storage areas. For example, application 101 may be Web browser accessing file 108 stored remotely, for example, using a variety of Internet-based services such as MobileMe™ available from Apple Inc. When a user downloads file 108, file 108 may be downloaded from a remote storage location and stored in sandboxed storage area 106 and atomically moved to another dedicated storage area located remotely. Thereafter, application 102 may access the remote storage location to access the file. In this situation, it is assumed that certain authentication and/or authorization mechanisms may be in placed. In addition, the techniques described throughout this application may also be applied to a situation in which file 108A is created or stored by first application 101, where the file 108A can be accessed by second application 102. For example, first application 101 may be a word processor that creates or stores file 108A in sandboxed storage area 105. A user of application 101 may desire to send file 108A through an email to a remote recipient. In this situation, second application 102, which may be an email client application, is invoked from first application 101 to attach the file into an outgoing email. As a result, file 108A is processed using the techniques set forth above and becomes file 108C stored in sandboxed storage area 107 to be processed by application 102. Thus, instead of attaching file 108A from sandboxed storage area 105, application 102 attaches file 108C from its own sandboxed storage area 107. Also note that some or all of the components as shown in FIG. 1 may be implemented in software, firmware, hardware, or a combination thereof.

Figure 2:
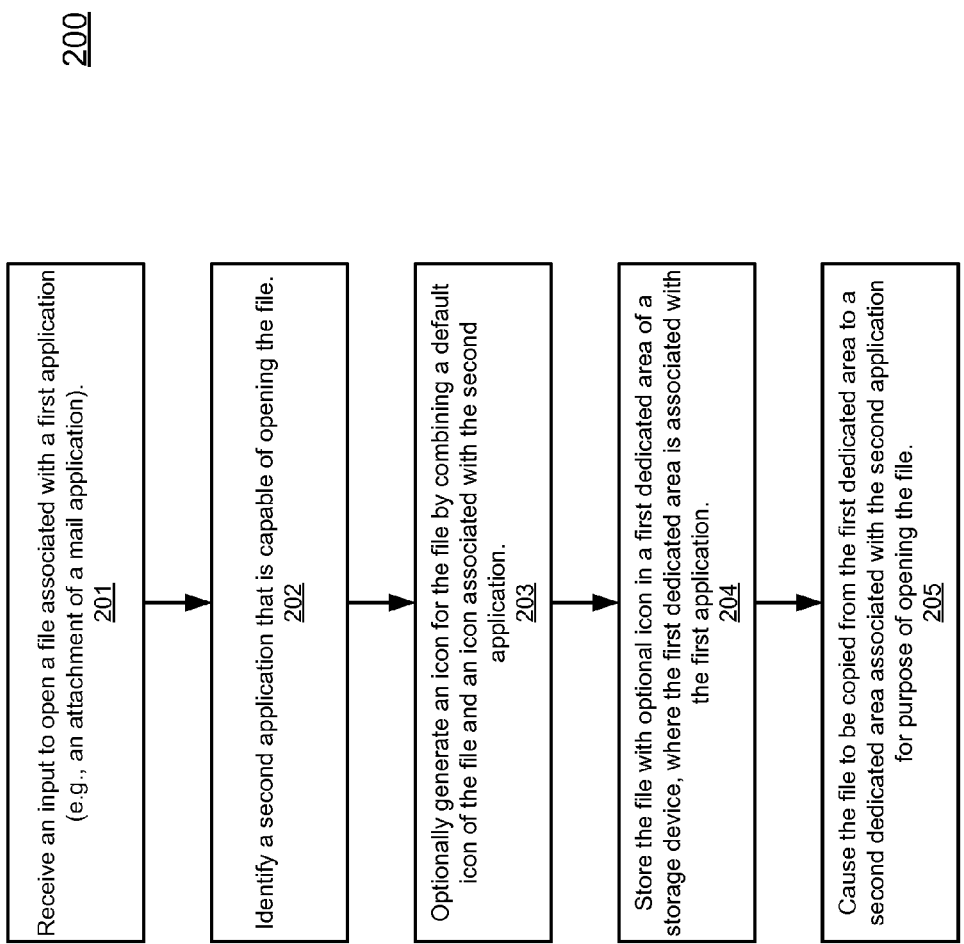
FIG. 2 is a flow diagram illustrating a method for handling a file associated with a program according to one embodiment.

FIG. 2 is a flow diagram illustrating a method for handling a file associated with an application according to one embodiment. Note that method 200 may be performed by processing logic which may include software, firmware, hardware, or a combination thereof. For example, method 200 may be performed by launch service module 109 of FIG. 1. Referring to FIG. 2, at block 201, an input is received to access a file associated with a first application. The file may be an attachment from a mail application. The input is received when a user attempts to access the file from the first application. In response to the input, at block 202, a second application is identified that is capable of accessing the file. In one embodiment, processing logic may access a database containing information concerning the types of applications that can be handled by certain application or applications. For example, processing logic may identify an application based on a file extension of the attachment.

At block 203, processing logic may optionally generate an icon for the file, for example, by combining an icon of the file and an icon of the identified application that is capable of accessing the file. At block 204, the file, as well as the icon is stored in a first dedicated storage area of the first application, where the dedicated storage area is a sandboxed storage area which is a part of a sandbox associated with the first application. At block 205, processing logic causes the file to be copied from the first dedicated storage area to a second dedicated storage area associated with the second application for the purpose of accessing for one or more of reading, writing, executing, and/or reading metadata of the file, where the second dedicated storage area is a sandboxed storage area associated with the second application.

Figure 3:
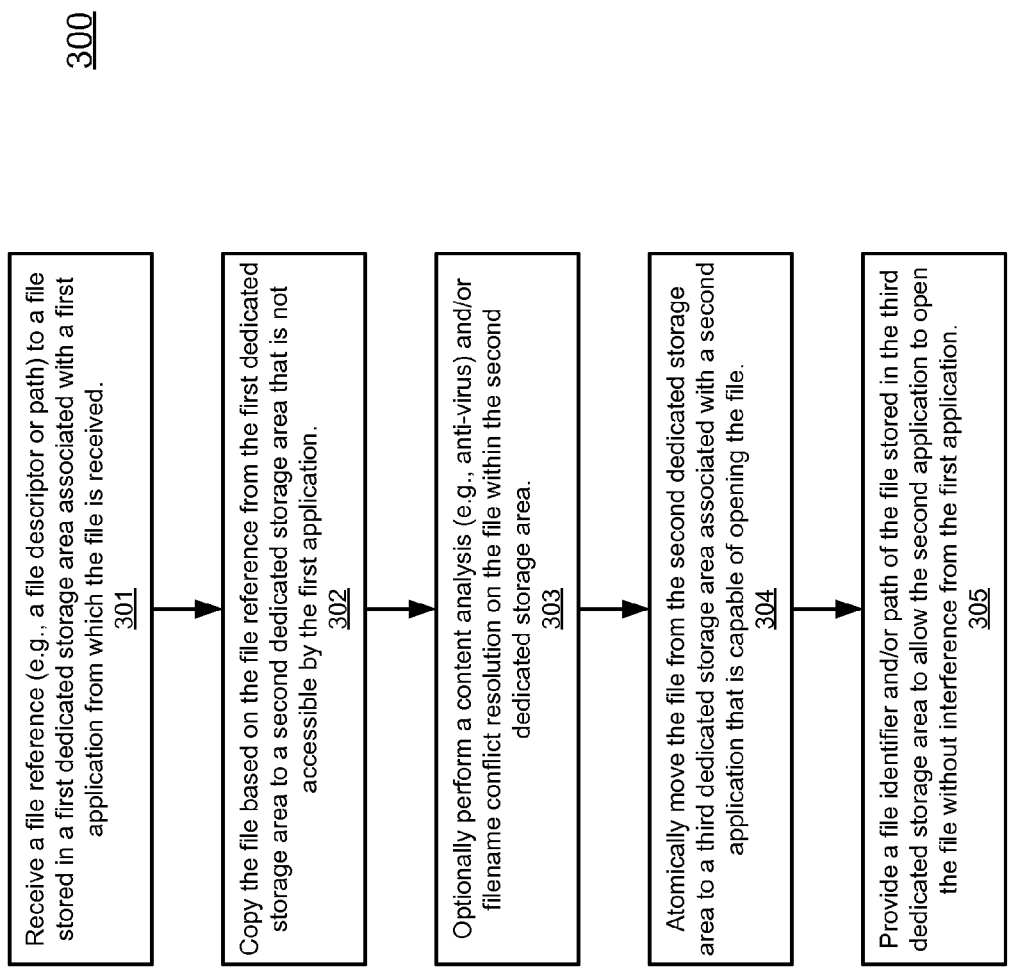
FIG. 3 is a flow diagram illustrating a method for handling a file associated with a program according to another embodiment of the invention.

FIG. 3 is a flow diagram illustrating a method for handling a file associated with an application according to another embodiment of the invention. Note that method 300 may be performed by processing logic which may include software, firmware, hardware, or a combination thereof. For example, method 300 may be performed by transport service module 110 of FIG. 1. Referring to FIG. 3, at block 301, processing logic receives a file reference such as a file descriptor and/or directory path to a file stored in a first sandboxed storage area (e.g., a source sandboxed storage area) associated with a sandbox of a first application. At block 302, the file is copied based on the file descriptor and/or directory path from the first sandboxed storage area (e.g., an intermediate sandboxed storage area) that is not accessible by the first application. At block 303, the processing logic optionally performs an inspection or content analysis (e.g., anti-virus operation) and/or filename conflict resolution operation on the file within the second sandboxed storage area. At block 304, the file is atomically moved from the second sandboxed storage area to a third sandboxed storage area (e.g., a destination sandboxed storage area) that is associated with a second application capable of accessing the file. At block 305, a file identifier (e.g., filename and/or directory path) to the file stored in the third sandboxed storage area is provided to allow the second application to access the file from the third sandboxed storage area without interference from the first application.

Figure 4:
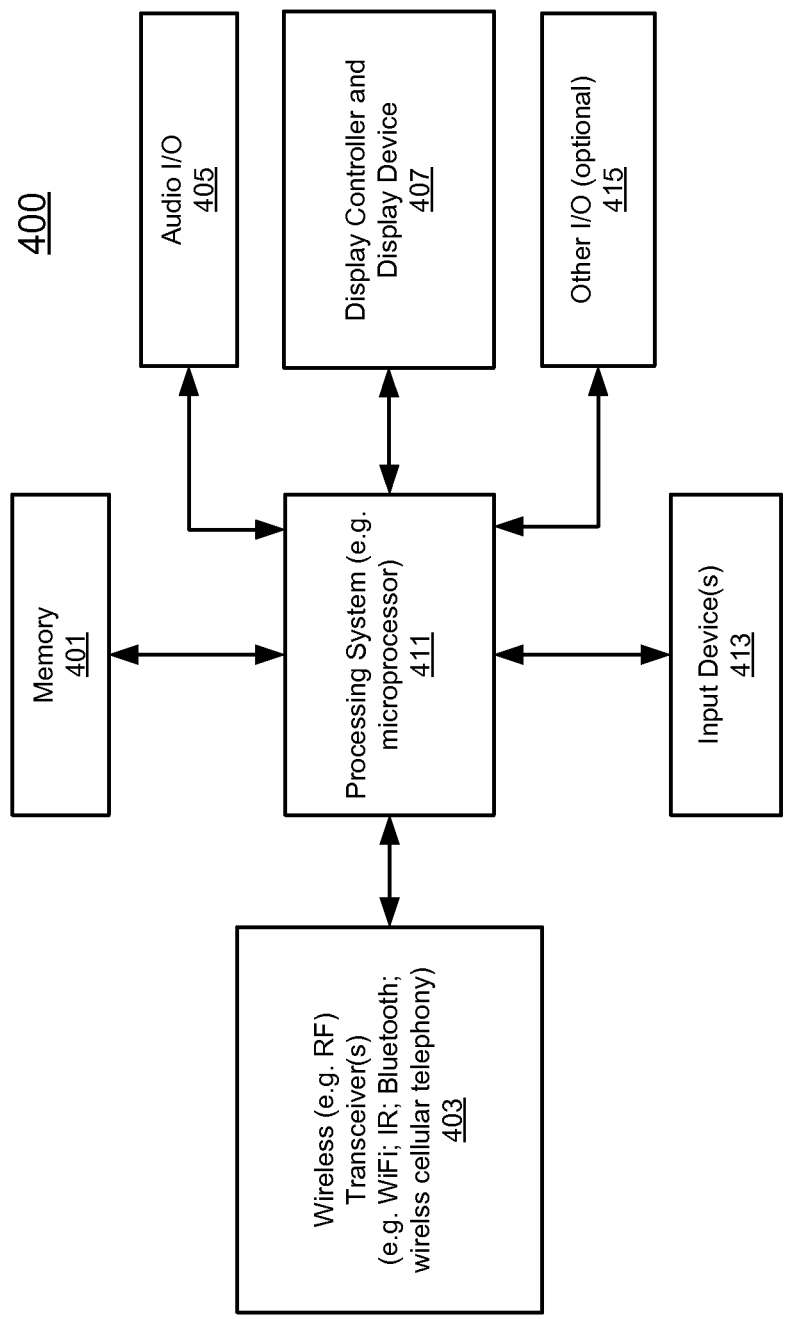
FIG. 4 shows an example of a data processing system which may be used with one embodiment of the present invention.

FIG. 4 shows an example of a data processing system which may be used with one embodiment of the present invention. For example, system 400 may be implemented as part of system 100 as shown in FIG. 1. The data processing system 400 shown in FIG. 4 can include processing system 411, which may be one or more microprocessors, or which may be a system on a chip of integrated circuit, and the system also includes memory 401 for storing data and programs for execution by the processing system. System 400 can also include audio input/output subsystem 405, which may include a microphone and a speaker for, for example, playing back music or providing telephone functionality through the speaker and microphone.

A display controller and display device 407 can provide a visual user interface for the user; this digital interface may, for example, include a graphical user interface that is similar to that shown on an iPhone® phone device or on a Macintosh computer when running operating system software. Alternatively, the graphical user interface may be similar to any other interface used on alternative hardware platforms. System 400 can also include one or more wireless transceivers 403 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of system 400 in certain embodiments, and in certain embodiments fewer components than shown in FIG. 4 may also be used in a data processing system.

Data processing system 400 can also include one or more input devices 413 which are provided to allow a user to provide input to the system. These input devices may be a keypad, a keyboard, a touch pad, a touch panel, or a multi touch panel. The data processing system 400 also includes an optional input/output device 415 which may be a connector for a dock. It will be appreciated that one or more buses, not shown, may be used to interconnect the various components as is well known in the art. The data processing system shown in FIG. 4 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 400 may be a network computer or an embedded processing device within another device, or other types of data processing systems which have fewer components or perhaps more components than that shown in FIG. 4.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod®, or iPod Nano® media player from Apple Inc. of Cupertino, Calif., a touch screen or multi-touch input device, pushbutton device, movable pointing input device or other input device. The media selection device may be used to select the media stored on the storage device and/or a remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for handling a file associated with a program, the method comprising:
    in response to a request for accessing a file that is received through a first program, storing the file in a first sandboxed storage area associated with a first sandbox associated with the first program, wherein the file is to be accessed by a second program;
    replicating the file from the first sandboxed storage area to a second sandboxed storage area that is associated with a second sandbox, wherein the second sandboxed storage area is not accessible by either the first program or the second program;
    performing a content analysis on the file within the second sandbox to determine whether the file contains malicious content;
    performing an atomic move operation on the file that atomically moves the file from the second sandboxed storage area to a third sandboxed storage area associated with a third sandbox, in response to determining that the file does not contain malicious content; and
    invoking the second program to access the file stored in the third sandboxed storage area within the third sandbox, wherein the third sandbox is not accessible by the first program.

2. The method of claim 1, wherein the first program is executed within the first sandbox and the second program is executed within the third sandbox.

3. The method of claim 2, further comprising generating a graphical representation for the file by combining an original graphical representation of the file with a graphical representation of the second program.

4. The method of claim 2, further comprising:
generating a key to be attached to the file based on an attribute of the first program, the key uniquely identifying the first program; and
storing the key as a part of an extended attribute of the file in the first sandboxed storage area, wherein the key is used to identify within the second sandboxed storage area that the file is associated with the first program.

5. The method of claim 4, wherein the first program is an electronic mail program and the file is an attachment to an electronic mail received through the electronic mail program.

6. The method of claim 2, wherein the first program is a remote access program and wherein the file is downloaded via the remote access program from a remote server over a network.

7. The method of claim 2, wherein the file is generated by a first program and is intended to be transmitted from the first program to the second program for further processing.

8. The method of claim 2, further comprising
preventing the file from being moved from the second sandboxed storage area to the third sandboxed storage area if malicious content of the file is detected based on the content analysis.

9. The method of claim 1, further comprising limiting activities of the second program within the third sandbox associated with the second program in view of a profile associated with the second program, during accessing the file from the third sandboxed storage area.

10. A non-transitory machine-readable storage medium having instructions stored therein which when executed by a machine, cause the machine to perform a method for handling a file associated with a program, the method comprising:
in response to a request for accessing a file that is received through a first program, storing the file in a first sandboxed storage area associated with a first sandbox associated with the first program, wherein the file is to be accessed by a second program;
replicating the file from the first sandboxed storage area to a second sandboxed storage area that is associated with a second sandbox, wherein the second sandboxed storage area is not accessible by either the first program or the second program;
performing a content analysis on the file within the second sandbox to determine whether the file contains malicious content;
performing an atomic move operation on the file that atomically moves the file from the second sandboxed storage area to a third sandboxed storage area associated with a third sandbox, in response to determining that the file does not contain malicious content; and
invoking the second program to access the file stored in the third sandboxed storage area within the third sandbox, wherein the third sandbox is not accessible by the first program.

11. The machine-readable storage medium of claim 10, wherein the first program is executed within the first sandbox and the second program is executed within the third sandbox.

12. The machine-readable storage medium of claim 11, wherein the method further comprises generating a graphical representation for the file by combining an original graphical representation of the file with a graphical representation of the second program.

13. The machine-readable storage medium of claim 11, wherein the method further comprises:
generating a key to be attached to the file based on an attribute of the first program, the key uniquely identifying the first program; and
storing the key as a part of an extended attribute of the file in the first sandboxed storage area, wherein the key is used to identify within the second sandboxed storage area that the file is associated with the first program.

14. The machine-readable storage medium of claim 13, wherein the first program is an electronic mail program and the file is an attachment to an electronic mail received through the electronic mail program.

15. The machine-readable storage medium of claim 11, wherein the first program is a remote access program and wherein the file is downloaded via the remote access program from a remote server over a network.

16. The machine-readable storage medium of claim 11, wherein the file is generated by a first program and is intended to be transmitted from the first program to the second program for further processing.

17. The machine-readable storage medium of claim 11, wherein the method further comprises
preventing the file from being moved from the second sandboxed storage area to the third sandboxed storage area if malicious content of the file is detected based on the content analysis.

18. The machine-readable storage medium of claim 10, wherein the method further comprises limiting activities of the second program within the third sandbox associated with the second program in view of a profile associated with the second program, during accessing the file from the third sandboxed storage area.

19. An apparatus for handling a file associated with a program, the apparatus comprising:
a transport service module, in response to a request for accessing a file that is received through a first program, to store the file in a first sandboxed storage area associated with a first sandbox associated with the first program, wherein the file is to be accessed by a second program, to replicate the file from the first sandboxed storage area to a second sandboxed storage area that is associated with a second sandbox, wherein the second sandboxed storage area is not accessible by either the first program or the second program, wherein the transport service module is configured to perform a content analysis on the file within the second sandbox to determine whether the file contains malicious content, and to perform an atomic move operation on the file that atomically moves the file from the second sandboxed storage area to a third sandboxed storage area associated with a third sandbox, in response to determining that the file does not contain malicious content; and
a launch service module coupled to the transport service module to invoke the second program to access the file stored in the third sandboxed storage area within the third sandbox, wherein the third sandbox is not accessible by the first program.

20. The apparatus of claim 19, wherein the first program is executed within the first sandbox and the second program is executed within the third sandbox.

21. The apparatus of claim 20, wherein the launch service module generates a graphical representation for the file by combining an original graphical representation of the file with a graphical representation of the second program.

22. The apparatus of claim 20, wherein the first program generates a key to be attached to the file based on an attribute of the first program, the key uniquely identifying the first program, and wherein the launch service module stores the key as a part of an extended attribute of the file in the first sandboxed storage area, wherein the key is used to identify within the second sandboxed storage area that the file is associated with the first program.

23. The apparatus of claim 22, wherein the first program is an electronic mail program and the file is an attachment to an electronic mail received through the electronic mail program.

24. The apparatus of claim 20, wherein the first program is a remote access program and the file is downloaded from a remote server via the remote access program over a network.

25. The apparatus of claim 20, wherein the file is generated by a first program and is intended to be transmitted from the first program to the second program for further processing.

26. The apparatus of claim 20, wherein the transport service module prevents the file from being moved from the second sandboxed storage area to the third sandboxed storage area if malicious content of the file is detected based on the content analysis.

27. The apparatus of claim 19, wherein activities of the second program are limited within the third sandbox associated with the second program in view of a profile associated with the second program, during accessing the file from the third sandboxed storage area.

\* \* \* \* \*